United States Patent Office 2,851,448
Patented Sept. 9, 1958

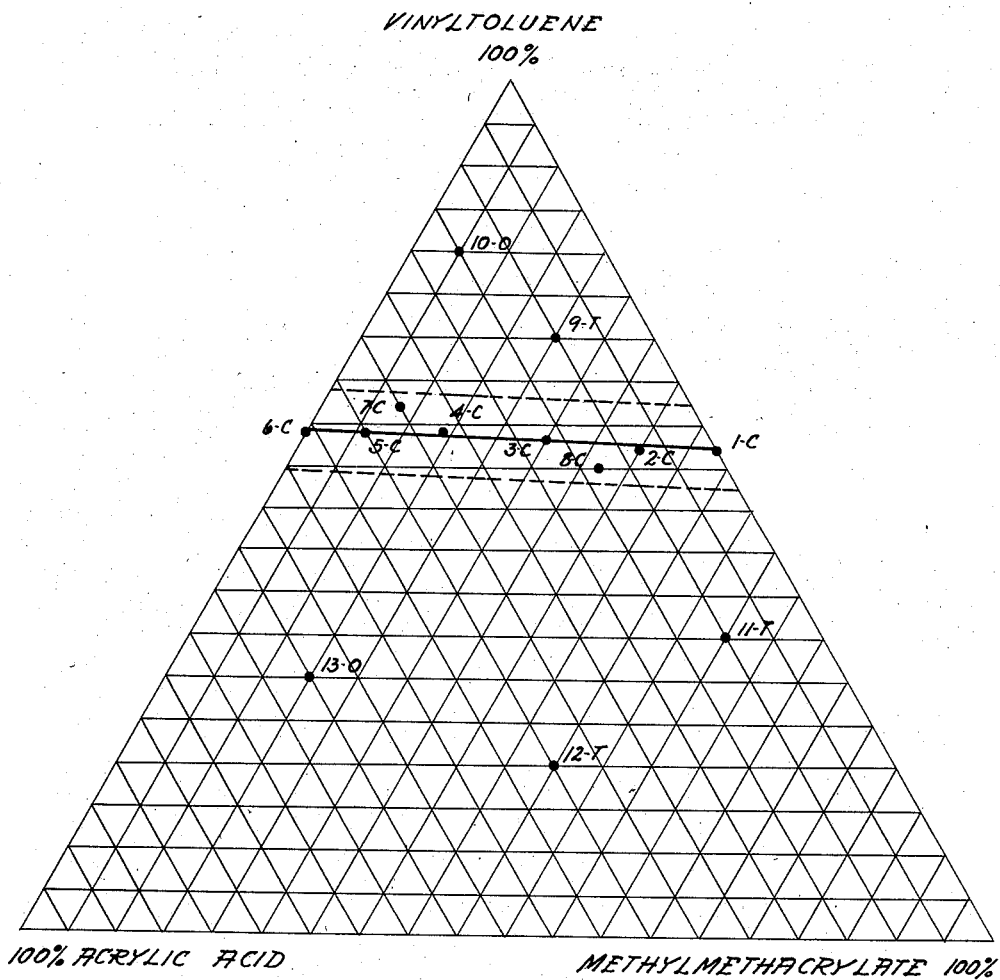

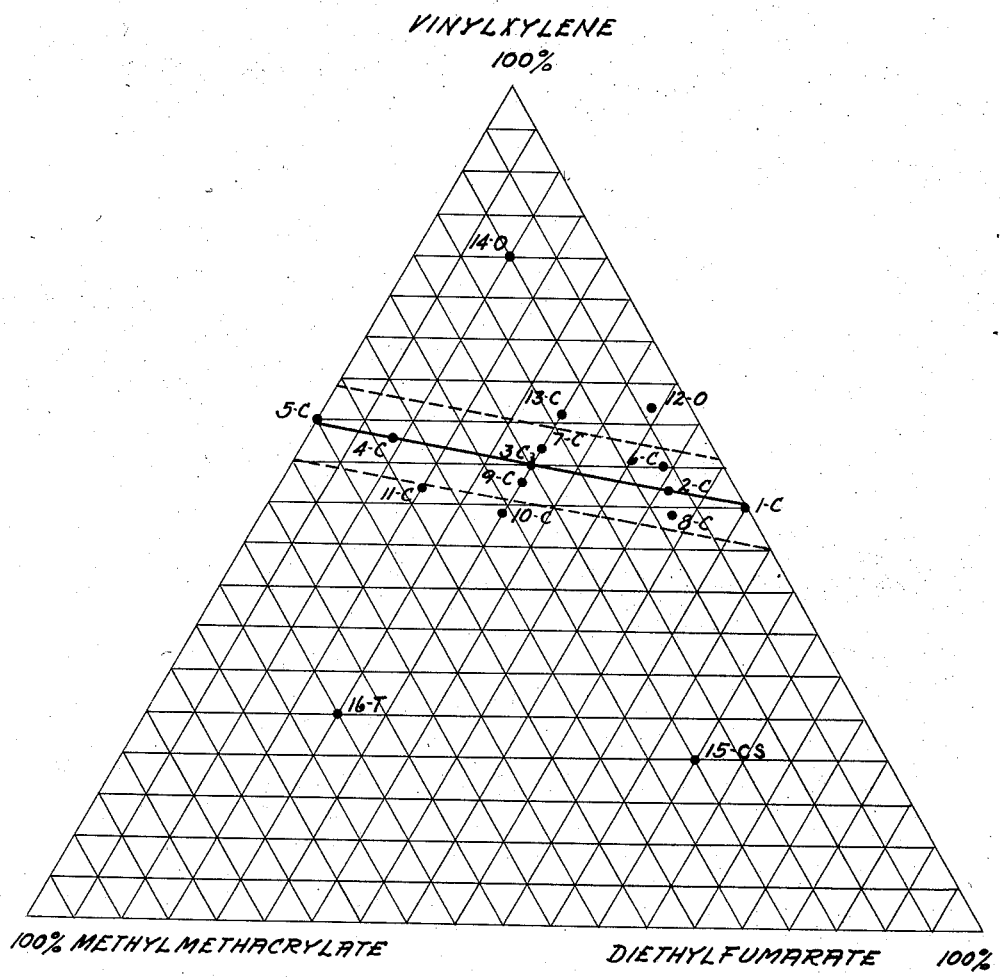
FIG. II
VINYLXYLENE/METHYLMETHACRYLATE/DIETHYLFUMARATE
TERPOLYMERS.
WT.%

2,851,448

TERPOLYMERS AND METHOD OF MAKING SAME

Robert J. Slocombe, Dayton, and George L. Wesp, Englewood, Ohio, assignors to Monsanto Chemical Company, St. Louis, Mo., a corporation of Delaware Application December 7, 1953, Serial No. 396,486

24 Claims. (Cl. 260—80.5)

This invention relates to three-component interpolymers, commonly called terpolymers, i. e., interpolymers prepared by polymerizing a monomeric mixture consisting of three different monomers. In specific aspects the invention pertains to terpolymers of (a) a monomer selected from the group consisting of styrene, vinyltoluene, and vinylxylene, (b) alkyl methacrylate, and (c) a monomer selected from the group consisting of acrylic acid, methacrylic acid, dialkyl fumarate, monoalkyl fumarate, and monoalkyl maleate. Other aspects of the invention relate to improved methods of preparing clear terpolymers.

It is by now well known that ethylenically unsaturated monomers differ greatly in their polymerization reactivity toward each other. There are in fact some monomers that will not undergo homopolymerization at all, i. e., polymerization of two or more molecules of the same monomer to form a polymer of that monomer, yet will readily undergo interpolymerization with certain other monomers. Interpolymerization affords a method of imparting varying characteristics to a polymer, and in many instances such characteristics cannot be obtained by mere physical admixture of two or more homopolymers. However, because of the above-mentioned differences in reactivity among monomers toward each other, marked heterogeneity is the rule in interpolymers and only under special circumstances can an interpolymer be obtained that is of sufficient homogeneity to give a transparent or clear interpolymer. While some objectionable properties such as color, encountered in interpolymers, can often be avoided by means such as the use of stabilizers or lower polymerization temperatures, incompatibility manifested by haze, turbidity, or opacity in plastics is not overcome by such treatment.

If a monomeric mixture is subjected to polymerization and the initial increment of polymer is segregated before the polymerization is allowed to go forward to an appreciable extent, it is frequently possible to obtain a clear interpolymer, but the commercial impracticability of such a procedure is apparent. On the other hand, if polymerization is permitted to proceed to a considerable and especially to a high degree of conversion, the more reactive monomer enters into the polymer to a greater extent than a less reactive monomer or monomers with the consequence that residual unreacted monomer becomes more and more depleted in the more reactive monomer, while the polymer being formed in the latter stages of polymerization is deficient in the more reactive monomer. There results a polymeric material which is made up of a variety of polymer molecules running a gamut of compositions such that the total polymer is heterogeneous with resultant opacity and often greatly impaired physical properties. This phenomenon, resulting in an undesirable product, can be overcome to an appreciable but limited extent by gradually adding during the course of the polymerization the more reactive monomer at a rate aimed at keeping the composition of unreacted monomeric mixture essentially constant. As a practical matter it is extremely difficult to approach uniformity in such an operation, and it is impossible to use this technique at all in the case of mass (bulk) polymerization in which the polymerization reaction mixture sets up into semi-solid or solid polymer after the reaction is only partly completed so that further access of added monomer to the total mixture cannot be obtained.

It is only in recent years that systematic laboratory and theoretical studies of interpolymerization have gone forward sufficiently to permit a certain amount of predictability in this field. It has been theorized that in a simple binary system involving the free-radical-initiated polymerization of only two monomers, the composition of polymer will be dependent only upon the rate of four propagation steps, i. e., steps in the propagation of polymer molecules. Thus, taking a system involving two monomers, $M_1$ and $M_2$, a growing polymer chain can have only two kinds of active terminal groups, i. e., a group derived from $M_1$ or a group derived from $M_2$. Either of these groups has the possibility of reacting with either $M_1$ or with $M_2$. Using $m_1\cdot$ and $m_2\cdot$ to indicate these active terminal groups, the four possible reactions are as follows:

| Growing Chain | Adding Monomer | Rate of Process | Reaction Product |
|---|---|---|---|
| $\sim m_1\cdot$ | $M_1$ | $k_{11}[m_1\cdot][M_1]$ | $\sim m_1 m_1\cdot$ |
| $\sim m_1\cdot$ | $M_2$ | $k_{12}[m_1\cdot][M_2]$ | $\sim m_1 m_2\cdot$ |
| $\sim m_2\cdot$ | $M_2$ | $k_{22}[m_2\cdot][M_2]$ | $\sim m_2 m_2\cdot$ |
| $\sim m_2\cdot$ | $M_1$ | $k_{21}[m_2\cdot][M_1]$ | $\sim m_2 m_1\cdot$ |

Theoretical considerations lead to the now generally accepted copolymer composition equation which describes the ratio $$\frac{[M_1]}{[M_2]}$$

of the molar concentrations of two monomers in the initial copolymer formed from a given mixture of the monomers as follows:

$$\frac{d[M_1]}{d[M_2]} = \frac{[M_1]}{[M_2]} \cdot \frac{r_1[M_1]+[M_2]}{r_2[M_2]+[M_1]}$$

In this equation $r_1$ equals $k_{11}/k_{12}$ and $r_2$ equals $k_{22}/k_{21}$. The terms $r_1$ and $r_2$ are called "reactivity ratios." A very considerable body of experimental work has in general confirmed the copolymer composition equation.

A large proportion of possible pairs of monomers are incapable, because of their respective reactivity ratios, of forming under any conditions an instantaneous polymer having the same composition as the monomeric mixture from which it is formed. However there are certain monomer pairs which, in a proportion characteristic of that pair, give a copolymer having the same composition as the particular monomeric mixture. In such instances, a batch polymerization can be carried out with a monomeric mixture of the particular composition with a resultant homogeneous copolymer containing the same relative proportions of the monomers as in the initial monomeric reaction mixture. This composition is known as the polymerization azeotrope composition, and is represented by the equation:

$$\frac{[M_2]}{[M_1]} = \frac{r_1-1}{r_2-1}$$

Such an azeotrope composition can exist only for those monomer pairs wherein both $r_1$ and $r_2$ are less than one, or theoretically wherein both $r_1$ and $r_2$ are greater than one although no examples of the latter combination are known.

While an understanding of interpolymerization involving only two monomers is now possible to a considerable extent, because of the development of the above-discussed theories, an increase in the number of monomers to three or more obviously tremendously increases the possibilities and complications. Thus, for example if interpolymers of 100 monomers are to be considered, there are about 5000 possible monomer pairs, but about 160,000 different combinations of three monomers are possible, and for each of these 160,000 combinations the variations in relative proportions of the three monomers are infinite. If the assumptions made in the development of the copolymer composition equation still hold true where three monomers are to be interpolymerized, it is apparent that the composition of the terpolymers formed at any given instance will now be dependent upon the rate of nine propagation steps which are dependent upon the relative concentrations of the monomers in the monomeric mixture and the reactivity ratio between each of the pairs of the monomers in the mixture. It has been pointed out that the study of terpolymers can be simplified somewhat by application of the copolymer composition equation, suitably modified for three-component systems, so as to eliminate from consideration monomers whose ability to interpolymerize is so slight that further investigation of such combinations is obviously not warranted. However, the discovery of terpolymers having particularly desired physical properties has to the present time been limited to the "needle in the haystack" type of investigation. There is an obvious need for some procedure in the terpolymer field whereby terpolymers of particular properties can be made with a reasonable degree of predictability.

In accordance with the present invention, we have found a group of terpolymers that can be made by free-radical-initiated batch polymerization and that have the very desirable property of clarity. These terpolymers are made by polymerizing a monomeric mixture of certain proportions of three monomers. The proportions giving clear terpolymers will vary from one monomeric mixture to another depending upon the particular monomers present in that mixture. The invention is particularly applied to monomeric mixtures consisting essentially of (a) a monomer selected from the group consisting of styrene, vinyltoluene, and vinylxylene, (b) an alkyl methacrylate, and (c) a monomer selected from the group consisting of acrylic acid, methacrylic acid, dialkyl fumarates, monoalkyl fumarates, and monoalkyl maleates. For example, a monomeric mixture consisting of styrene, methyl methacrylate, and diethyl fumarate will, when subjected to free-radical-initiated batch polymerization, give a clear terpolymer only if the relative proportions of styrene, methyl methacrylate, and diethyl fumarate are properly chosen in the manner to be hereinafter described. In contrast, a monomeric mixture consisting of vinyltoluene, methyl methacrylate, and acrylic acid will give a clear terpolymer on being subjected to free-radical-initiated batch polymerization only if the relative proportions of the three mentioned monomers in the monomeric mixture are within certain limits which in general are different from those of the aforementioned mixtures of styrene, methyl methacrylate and diethyl fumarate and yet which are chosen in accordance with the same principle now to be discussed.

We have found that clear terpolymers of the nature described are made provided the proportions of three monomers in the monomeric mixture are chosen from the area lying along the line joining the binary polymerization azeotrope composition of the particular (a) and the particular alkyl methacrylate on the one hand, and the binary polymerization azeotrope composition of the particular (a) and the particular (c) on the other hand, as plotted on a triangular coordinate graph. By way of example, taking the case where (a) is vinyltoluene, (b) is methyl methacrylate, and (c) is acrylic acid, the point of the binary azeotrope composition of vinyltoluene and methyl methacrylate is placed along one side of a triangular coordinate graph at the proper location between the apex designating 100 percent vinyltoluene and the apex designating 100 percent methyl methacrylate. This point is 57.1 weight percent vinyltoluene and 42.9 weight percent methyl methacrylate. On the opposite side of the equilateral triangle, constituting the triangular coordinate graph, is placed the point representing the binary azeotrope composition of vinyltoluene and acrylic acid, this, of course, being located at the proper position on the side of the triangle between the apex representing 100 percent vinyltoluene and the apex representing 100 percent acrylic acid. This point is 59.2 weight percent vinyltoluene and 40.8 weight percent acrylic acid. Now a straight line is drawn between these two points. This line cuts across the triangular coordinate graph, without touching the side of the triangle opposite the vinyltoluene apex, which side represents varying proportions of methyl methacrylate and acrylic acid in binary mixtures of same. Methyl methacrylate and acrylic acid do not form a binary azeotrope. The said straight line joining the two points of binary azeotrope compositions describes three-component monomeric mixtures which, when subjected to free-radical-initiated batch polymerization, give clear terpolymers. Further, there is an appreciable area lying on each side of said line in which the terpolymers are essentially clear. However, one cannot go too far from this line without producing terpolymers which are not clear but range from hazy to opaque materials. The invention particularly applies to the area lying within 5 percent on each side of said line; said 5 percent is measured on the graph in a direction normal to the line, and is equal to five one-hundredths of the shortest distance between an apex and the side of the triangle opposite the apex. (Another way of saying the same thing is that the invention particularly applies to the area of the graph bounded by two lines on opposite sides of and parallel to and 5 graphical units distant from said line.) Terpolymers made by polymerizing a monomeric mixture having a composition lying in the area within 5 percent on each side of the line joining the two binary polymerization azeotrope compositions, are generally clearer than polymers made from similar monomeric mixtures lying farther away from and on the same side of the line. In most systems all terpolymers made from monomeric mixtures having compositions in the area lying within 5 percent on each side of the line are clear. In some systems the area of clarity may not extend as far as 5 percent from the line. Those skilled in the art, having had the benefit of the present disclosure, can easily determine by simple tests of the nature described herein which monomeric mixtures give clear terpolymers in a given polymerization system. In all events, the compositions of monomeric mixtures giving clear terpolymers will be found to constitute an area lying along and encompassing the line joining the two binary polymerization azeotrope compositions.

The reasons for the clarity of terpolymers made as described are not known. The line joining the two binary azeotrope compositions does not represent what might be called a series of three-component azeotropes. From much detailed data which we have obtained, the relative proportions of the three monomers in terpolymers made from monomeric mixtures lying along said line are not identical to the monomeric mixture from which the terpolymer is being prepared. In other words, during the course of a batch polymerization of a monomeric mixture whose composition is taken from the line, the composition of residual monomeric material drifts and the terpolymers so formed are not homogeneous mixtures of polymer molecules all of which contain monomer units in the same ratio, but rather are mixtures of polymer molecules having varying proportions of the three monomer units therein. No heretofore known scientific facts or theories of interpolymerization explain our discovery. However, regardless of the various reasons for believing that terpolymers made from compositions lying along the line as aforesaid would be heterogeneous, and regardless of the actual reasons for the clarity of such terpolymers, it is apparent that the present invention makes possible the production of clear terpolymers with obvious attendant advantages, especially in films and molded articles made from the terpolymers.

The accompanying drawings are triangular coordinate graphs showing compositions of some three-component monomeric mixtures that give clear terpolymers on being subjected to free-radical-initiated batch polymerization.

Figure I represents the system vinyltoluene/methyl methacrylate/acrylic acid.

Figure II represents the system vinylxylene/methyl methacrylate/diethyl fumarate.

By the present invention we can subject a given monomeric mixture consisting of three monomers, selected as described herein, to a batch polymerization and carry the polymerization reaction to complete or essentially complete, say 90 to 100 per cent, conversion of all of the monomers and yet obtain a clear solid resinous terpolymer. If desired, the polymerization can be stopped at any point short of completion so long as polymerization conditions are such as to produce solid terpolymer, but this is not necessary in order to obtain a clear terpolymer and would seldom be advantageous. The higher the degree of conversion of monomeric mixtures, the greater the advantages of our invention. This is because the greatest extent of heterogeneity is found with complete conversion to polymers. A high conversion, i. e., at least 50 weight percent conversion and preferably at least 80 weight percent conversion, is preferred in practicing the invention. However, some of the benefits of the invention may be realized even where the percentage conversion is as low as 20 percent. With very low conversions, the polymer formed tends to approach the perfect homogeneity existing in the first infinitely small increment of polymer formed. As pointed out above, commercial practicality requires that conversion be carried to a value more than a few per cent, hence introducing the lack of homogeneity which up to now, the art has not known how to avoid other than by techniques such as gradual monomer addition. It is to be recognized that the extent of the area of clear terpolymers, lying along the line joining the two binary polymerization azeotrope compositions, is dependent not only on the particular polymerization system but also on the percentage conversion, said area being the greater the lower the percentage conversion, and the smaller the higher the percentage conversion. It is observed that the terpolymers become clearer as the composition of the monomeric mixture approaches the line joining the two binary azeotrope compositions, the general rule being that the clearest terpolymers are those derived from monomeric compositions lying on the line.

It is usually desirable that the three-component monomeric mixture contain at least 2 weight percent, and preferably at least 5 weight percent, of the monomer present in the smallest amount.

The invention is broadly applicable to any free-radical-initiated interpolymerization of three-component monomeric mixtures containing the monomer combinations and in the proportions set forth herein, provided the polymerization is carried out by a batch procedure. By this it is meant that all of the monomeric materials to be employed are introduced simultaneously in the desired proportions into the polymerization reaction system. Ordinarily a single charge of monomeric materials will be placed in a reaction vessel and the single charge subjected to polymerization conditions until the polymerization is substantially complete. However, it is not outside the scope of our invention to introduce continuously a monomeric mixture containing the three monomers in fixed proportions into a flow-type polymerization system, whereby the initial polymerizable mixture passes away from its point of introduction and ultimately is recovered as polymer. This can be accomplished by continuous flowing of the monomeric mixture into the first of a series of polymerization reaction vessels with continuous flow of reaction mixture from one vessel to another along a series of two or more such vessels with ultimate recovery of polymer from the last in the series. Those skilled in the art will understand that this operation is essentially a batch operation in the sense that additional monomeric material of composition different from the original mixture is not introduced into a partially polymerized material. Thus, the term "batch polymerization," as used herein, means a polymerization which does not involve the gradual or incremental or subsequent addition of a monomer or monomers having a composition different from the initial monomeric mixture.

The invention is perhaps most advantageously effected by the mass or bulk polymerization procedure. In such procedure the reaction mixture is free from added solvent or other reaction medium and consists solely of monomers, resultant polymers, and catalyst and regulator, if any. An important advantage of the invention is that such a mass polymerization can be effected to produce a clear terpolymer in a situation in which it is impossible to use the gradual monomer addition technique discussed above.

If desired, the interpolymers of the present invention can be made by the suspension or the emulsion polymerization techniques. For suspension polymerization a reaction medium such as water is used together with a small amount of suspending agent, for example tricalcium phosphate, carboxymethylcellulose, etc., to give a suspension of particles of initial monomeric mixture, which particles are not of such small size as to result in a permanently stable latex. Where the particles are of quite large size, this type of polymerization is often called "pearl" polymerization. To effect emulsion polymerization, sufficient amount of emulsifying agent, for example a water-soluble salt of a sulfonated long chain alkyl aromatic compound, a surface active condensation product of ethylene oxide with long chain aliphatic alcohols or mercaptans, etc., is employed along with vigorous agitation whereby an emulsion of the reactants in water is formed and the product is obtained in the form of a latex. The latex can then be coagulated if desired by known methods and the polymer separated from the water. For some applications the latex can be employed directly as for example for forming a film, and the resulting film after evaporation of the water will be clear when the polymers are made in accordance with the present invention. The emulsion technique has certain advantages particularly in that a very high degree conversion of the monomers is obtained with considerable rapidity, since the heat of reaction is easily carried off by indirect heat exchange with the reaction mixture which contains a considerable proportion of water. Such polymerizations are often effected with redox-type catalyst systems at moderate temperatures of say 60° C. on down to 0° C. and below.

The polymers of the present invention can also be made in the presence of an added organic solvent. It should be recognized however that the presence of such a solvent ordinarily results in a polymer of lower molecular weight than that obtained in the absence of the solvent.

Conventional recipes and procedures for effecting mass, solvent, suspension and emulsion polymerizations are so well-known to those skilled in the art, that they need not be further detailed here.

From the foregoing, it will be apparent that the term, "monomeric mixture," as used in the claims refers only to the polymerizable monomeric materials used in the process, and that additionally solvents, aqueous reaction media, catalysts, etc., can be present or not in the reaction mixture as may be desired in any particular case. In other words, in the claims "monomeric mixture" is not necessarily synonymous with "reaction mixture."

Polymerization can be effected by any of the well-known free radical mechanisms. The polymerization is initiated and carried on by virtue of free radicals, which can be derived from the monomers themselves on simple heating of the monomeric mixture to a suitable temperature, or can be derived from added free-radical-supplying catalysts, especially the "per" compounds and the "azo" compounds, or can be derived by ultraviolet or other irradiation of the reaction mixture with or without the presence of photosensitizers, e. g., organic disulfides. The examples set forth hereinafter describe "thermal" polymerizations in which the polymerization reaction was initiated and maintained merely by heating the monomeric mixture in the absence of any added catalyst. In many instances it will be desired to add a suitable polymerization catalyst, in which case sufficient catalyst is employed to give a desired reaction rate. Suitable catalysts are of the free-radical-promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include benzoyl peroxide, ditertiary butyl peroxide, tertiary butyl hydroperoxide, diacetyl peroxide, diethyl peroxycarbonate, 2-phenyl propane-2-hydroperoxide (known also as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N— bonded to one or two organic radicals, preferably at least one of the bonds being to a tertiary carbon atom. By way of example of suitable azo-type catalysts can be mentioned α,α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of one percent by weight based upon the monomeric material. A suitable quantity is often in the range of 0.05 to 0.5 percent by weight.

Photopolymerization is another suitable procedure for carrying out the present invention. This is ordinarily accomplished by irradiating the reaction mixture with ultraviolet light. Any suitable source of light is employed having effective amounts of light with wave lengths of 2,000 to 4,000 Angstrom units. The vessel in which the polymerization is conducted should be transparent to light of the desired wave length so that the light can pass through the sides of the container. Suitable glasses are available commercially and include borosilicate ("Pyrex"), "Vycor," and soft glass. Alternatively, the source of light can be placed directly over the surface of the monomer in a container or can be placed within the reaction mixture itself. In some instances it is helpful to add a material that can be termed a photosensitizer, i. e., a material which increases the rate of photopolymerization, for example organic disulfides as described in U. S. Patent No. 2,460,105.

Choice of a suitable temperature for a given polymerization will readily be made by those skilled in the art having been given the benefit of the present disclosure. In general, suitable temperatures will be found within the range of 0° C. to 200° C., although temperatures outside this range are not beyond the scope of the invention in its broadest aspects. The time required for complete polymerization will depend not only upon the temperature but also upon the catalyst if any is employed, the ability of the system to remove heat of polymerization, and the particular monomers employed. The examples set forth hereinafter give some illustrative information as to reaction times for particular polymerizations.

The term "triangular coordinate graph" as used herein is well understood. The accompanying figures are examples of such graphs and the use of same. However, for the sake of completeness the following statement can be made concerning the character of such triangular graphs. The graph is an equilateral triangle, divided off by three series of parallel lines each series being parallel to one side of the triangle. The distance between an apex of the triangle and the side opposite that apex represents variations in percentages of the component designated by that apex varying from 100 percent to 0 percent in equal increments running from the apex to the opposite side of the triangle. For example, if the distance between the apex and the side of the triangle opposite the apex is divided into 100 equal parts by lines passing across the triangle and parallel to said side, each line represents 1 percent of the component for which that apex is designated. Thus, any point within the triangle represents a single three-component composition, the indicated percentages of the three components totaling 100 percent.

As an aid in the choice of suitable proportions of monomers for polymerization in accordance with the invention the following data on reactivity ratios of certain monomer pairs are presented by way of example. The values given are considered the best ones represented in the literature or otherwise known (see "Copolymers" by Alfrey, Bohrer and Mark, Interscience Publishers, Inc., 1952, pp. 32–43). In many instances an attempt is made to set forth an approximate order of accuracy. These latter figures, expressed as plus or minus certain values, should not however be given too much credence since such attempts to evaluate possible errors are dependent to a considerable extent on subjective evaluation of the data. Most of the values for reactivity ratios given are for moderate temperatures, say between about room temperature (20° C.) and 100° C. Of course, the value of the reactivity ratios for a monomer pair is a function of temperature but the variation in reactivity ratios with temperature is quite small and is of little importance unless the polymerization is to be carried out at temperatures considerably removed from those mentioned. Likewise, the reactivity ratios given are for atmospheric or autogenous pressure. Only if the polymerization pressure is to be quite considerably increased will there be an important change in the value of the reactivity ratios. It may also be pointed out that in the case of highly water-soluble monomers the reactivity ratio values may be shifted somewhat from those given, when polymerization is effected in an aqueous system. Those skilled in the art, having been given the benefit of the present disclosure, will be able to evaluate the effect, if any, of reaction conditions on the values given herein and determine the extent of such effect. Similarly, those skilled in the art can determine by well-known procedures the correct reactivity ratios for monomer pairs not specifically set forth in the following tabulation, which tabulation is given by way of example of some but not all of the monomers that are the subject matter of the present invention.

In the following tabulation styrene is considered as $M_1$ and the other monomers in each instance are considered as $M_2$. Substitution of the values for $r_1$ and $r_2$ in the equation given above for the binary polymerization azeotrope composition permits an immediate determination of the proper location for the two points to be placed on the triangular coordinate graph, between which points is drawn the line of clear terpolymers.

TABLE

| $M_1$ | $M_2$ | $r_1$ | $r_2$ |
|---|---|---|---|
| Styrene | Methyl methacrylate | 0.520±0.026 | 0.460±0.026 |
| Do | Acrylic acid | 0.15 ±0.01 | 0.25 ±0.02 |
| Do | Methacrylic acid | 0.15 ±0.01 | 0.7 ±0.05 |
| Do | Diethyl fumarate | 0.30 ±0.02 | 0.07 ±0.007 |
| Do | Dimethyl fumarate | 0.21 ±0.02 | 0.025±0.015 |
| Do | Monoethyl fumarate | 0.18 ±0.10 | 0.25 ±0.10 |
| Do | Monoethyl maleate | 0.13 ±0.01 | 0.035±0.01 |

Where $M_1$ is to be vinyltoluene or vinylxylene, the same reactivity ratios are used, on the assumption that the reactivity ratios for such systems do not differ essentially for the purposes of this invention from the reactivity ratios of the corresponding systems wherein styrene is $M_1$. This assumes that the introduction of one or two methyl groups into the aromatic nucleus of styrene does not greatly alter the polarity and steric properties of the vinyl double bond. Likewise, when a alkyl methacrylate other than methyl methacrylate is to be used, the reactivity ratios are assumed not to differ essentially for the purposes of this invention from the above reactivity ratios involving methyl methacrylate. This assumes that a moderate increase in the chain length of the alkyl group in the alkyl methacrylates over the single carbon atom in the methyl group of methyl methacrylate, or a branching of the chain if such is present, does not greatly alter the polarity and steric properties of the vinyl double bond. Similar assumptions are made with respect to the various dialkyl fumarates as a group, with respect to the various monoalkyl fumarates as a group, and with respect to the various monoalkyl maleates as a group. Thus, although the reactivity ratios for styrene/dimethyl fumarate and for styrene/diethyl fumarate appear to differ considerably from each other, the values of the binary azeotrope compositions for these two systems calculated from said different reactivity ratios, given in the table above, differ from each other by only two percentage points. Anyone skilled in the art, desiring greater precision, can use well-known standard procedures to determine the reactivity ratios for a given binary system not previously reported in the art. With monomers having fairly long chain alkyl groups, the reactivity ratios tend to differ considerably from those for the corresponding methyl monomer and hence should be individually determined. Whenever weight percent rather than mole percent is desired as a matter of convenience, mole percentages of the binary azeotrope compositions are easily converted to weight percent by use of the molecular weights of the particular $M_1$ and $M_2$. In the case of alkyl methacrylates (b), and dialkyl fumarates, monoalkyl fumarates, and monoalkyl maleates (c), any of which can be selected as the respective (b) or (c) monomer to be copolymerized with any one of the (a) monomers styrene, vinyltoluene and vinylxylene in the practice of this invention, special preference is given to the lower alkyl groups. Alkyl groups containing from 1 to 4 carbon atoms are particularly valuable, viz., methyl, ethyl, n-propyl, isopropyl, n-butyl, iso-butyl, sec.-butyl, tert.-butyl. However, the invention is also applicable to the alkyl compounds mentioned, that contain alkyl groups of up to 8 carbon atoms per alkyl group and even higher. In the case of dialkyl fumarates, there are included those dialkyl fumarates wherein both alkyl groups are the same and those dialkyl fumarates wherein two different alkyl groups are present in the molecule.

The following examples illustrate some methods for practicing the present invention with respect to certain ternary mixtures of monomers. The general applicability of the invention, and advantages thereof, are shown in these examples. It will be appreciated that variations can be made in the particular choice of monomers, proportions, and methods of polymerization in accordance with the general teachings of the present specification, and the examples are not to be taken as coextensive with the invention in its broadest aspects.

*Example 1*

This example concerns the ternary system vinyltoluene/methyl methacrylate/acrylic acid. The composition of the vinyltoluene/methyl methacrylate binary azeotrope was calculated in the following manner according to the article by Mayo and Walling, Chemical Reviews, 46, 19 (1950). The assumption is made that the reactivity ratios for this binary system do not differ essentially for the purposes of this invention from the reactivity ratios of the corresponding styrene/methyl methacrylate system. This assumes that the introduction of a methyl group into the aromatic nucleus of styrene does not greatly alter the polarity and steric properties of the vinyl double bond.

Vinyltoluene ($M_1$)
Methyl methacrylate ($M_2$)
$r_1 = 0.52$
$r_2 = 0.46$ $$\frac{[M_1]}{[M_2]} = \frac{0.46 - 1}{0.52 - 1} = \frac{0.54}{0.48} = 1.125$$

$[M_1] + [M_2] = 100$
$1.125[M_2] + [M_2] = 100 = 2.125[M_2]$
$[M_2] = 47.1$ mole percent methyl methacrylate
$[M_1] = 52.9$ mole percent vinyltoluene
Molecular weight of methyl methacrylate = 100.11
Molecular weight of vinyltoluene = 118.17
$0.471 \times 100.11 = 47.2$ grams methyl methacrylate
$0.529 \times 118.17 = 62.5$ grams vinyltoluene 109.7 grams mixture
$(47.2 \times 100)/109.7 = 42.9$ weight percent methyl methacrylate
$(62.5 \times 100)/109.7 = 57.1$ weight percent vinyltoluene The foregoing calculations give the composition of the vinyltoluene/methyl methacrylate binary polymerization azeotrope as 57.1 weight percent vinyltoluene, 42.9 weight percent methyl methacrylate.

By the same procedure, and using the reactivity ratios for the binary system styrene/acrylic acid for the reasons discussed hereinabove, the binary polymerization azeotrope for vinyltoluene/acrylic acid was calculated to be 59.2 weight percent vinyltoluene, 40.8 weight percent acrylic acid.

A series of monomeric mixtures was made up, each mixture being prepared by admixture of the individual pure monomers in a "Pyrex" test tube 150 mm. long and having an internal diameter within the approximate range of 14 to 18 mm., usually about 16 mm. Each test tube containing the particular monomeric mixture was flushed with nitrogen in order to remove any air present in the gas space above the liquid, and the test tube was then sealed off at the top by heating the tube under nitrogen and pulling it out in the flame to seal the tube completely. Each particular monomer mixture was prepared and polymerized in duplicate. No added catalyst or initiator was used.

The vinyltoluene employed in these tests was a mixture of isomeric meta- and para-methylstyrene.

After the various tubes containing the monomeric mixtures had been prepared, they were placed in a 90° C. constant temperature bath, and held there for 24 hours. At the end of that period they were moved to a 120° C. constant temperature bath and held there for 65 hours. At the end of this period of heating at 120° C., the tubes were removed and placed in an oven, maintained at 180° C. and held therein for 8 hours.

The various monomeric compositions are set forth in detail in Table I. Table I designates each different mixture by sample number. By reference to Table I and to Figure I, wherein the compositions of the various samples are plotted, it will be seen that points 1 to 6 inclusive, were on or approximately on the line joining the two binary azeotrope compositions, that points 7 and 8 were a few percentage points away from the line on opposite sides of the line, that points 9 and 10 were a farther distance from the line in the direction of increas vinyltoluene content, while points 11, 12 and 13 were on the opposite side of the line and covered a wide variety of compositions. In this manenr the clarity or lack of clarity of terpolymers made from a variety of monomer compositions both near the line and at a distance from the line on each side of the line was determined.

At the end of the polymerization cycle described above, all the polymers formed in the sealed tubes were carefully examined visually by the same observer, looking through the diameter of the cylindrical body of polymer obtained by breaking and removing the glass tube; this cylinder of polymer conformed to the internal shape and size of the glass tube. These visual observations were checked by other observers. It was determined that the clarity noted for polymer samples is not significantly affected by variation in polymer cylinder diameter within the range of about 14 to 18 millimeters. It is to be understood that where clarity of polymers is discussed herein, reference is made to the appearance on looking through a cylindrical body of the polymer having a diameter within the approximate range of 14 to 18 millimeters. The following words were adopted for describing the clarity of polymers.

C—Clear—essentially crystal clear
H—Hazy—some cloudiness but slight
T—Turbid—moderately cloudy
O—Opaque—dense cloudiness—similar to milk glass in appearance "Clear" means relatively free from gross amounts of haze but allows the presence of slight haze to be detected with close examination in strong light. Specific notation that a sample was "crystal" clear means not only that no haze was apparent to the observer, but also that the sample showed a sparkling appearance as found in high quality crystal glassware.

TABLE I.—VINYLTOLUENE/METHYL METHACRYLATE/ACRYLIC ACID TERPOLYMERS

| Sample Number | Composition, Wt. Percent Acrylic MMA/VT/Acid | Appearance | |
|---|---|---|---|
| | | Clarity | Color |
| 1 | 43/57/0 | C—Crystal Clear | Colorless. |
| 2 | 35/57/8 | do | Do. |
| 3 | 25/58/17 | do | Do. |
| 4 | 14/59/27 | do | Do. |
| 5 | 6/59/35 | do | Do. |
| 6 | 0/59/41 | do | Do. |
| 7 | 8/62/30 | do | Do. |
| 8 | 32/55/13 | do | Do. |
| 9 | 20/70/10 | T—Turbid | White. |
| 10 | 5/80/15 | O—Opaque | Do. |
| 11 | 55/35/10 | T—Turbid | Do. |
| 12 | 45/20/35 | do | Do. |
| 13 | 15/30/55 | O—Opaque | Do. |

MMA=Methyl methacrylate.
VT=Vinyltoluene.

Referring now to Figure I of the drawings, the clarity data given in Table I have been designated alongside each of the corresponding ternary monomeric mixture compositions indicated by a point on a triangular coordinate plot. The various numerals on Figure I located adjacent the respective points refer to the sample number in Table I. All of the points marked "C" were rated as clear, "T" is turbid, etc. Examination of Figure I immediately shows that terpolymers prepared from monomeric mixtures having compositions lying on the line joining the two binary azetrope compositions were clear, as were terpolymers within the area lying along said line. Thus, points 1 to 6 on the line, and points 7 and 8 off the line but within 5 percent of the line, were all clear. However, points 9 and 10 a greater distance from the line in the direction of increasing vinyltoluene content were turbid and opaque, respectively. Also, points 11, 12, and 13 on the opposite side of the line and representative of monomeric mixtures of great variation in composition were turbid or opaque.

In Figure I the dashed lines drawn parallel to the line joining the two binary azeotrope compositions are 5 percent on each side of the line, i. e., each is a distance from the line equal to 5 percentage points of composition as determined by dividing the distance between an apex and the center of the opposite side of the triangle into 100 equal equidistant parts; in other words, the two dashed lines are on opposite sides of and 5 graphical units distant from said line. These 5 percent lines delineate a preferred area of monomer compositions for use in making terpolymers with these monomers.

*Example 2*

This example presents data on the ternary system vinylxylene/methyl methacrylate/diethyl fumarate.

The reactivity ratios for the system vinylxylene/methyl methacrylate and for the system vinylxylene/diethyl fumarate were assumed not to differ essentially for the purposes of this invention from the reactivity ratios of the corresponding systems styrene/methyl methacrylate and styrene/diethyl fumarate, respectively. This assumes that the introduction of two methyl groups into the aromatic nucleus of styrene does not greatly alter the polarity and steric properties of the vinyl double bond. Mole ratios for the two binary polymerization azeotropes were calculated in the manner described in Example 1, and these were then converted to weight ratios, employing the molecular weight of vinylxylene in each instance.

In this manner, the binary polymerization azeotrope composition of vinylxylene/methyl methacrylate was calculated to be 59.7 weight percent vinylxylene, 40.3 weight percent methyl methacrylate. Similarly, the binary polymerization azeotrope composition of vinylxylene/diethyl fumarate was calculated to be 50.4 weight percent vinylxylene, 49.6 weight percent diethyl fumarate.

Samples were prepared and tested in the manner set forth in Example 1. For all samples except No. 15, the polymerization cycle was 24 hours at 90° C., 24 hours at 120° C., 8 hours at 180° C. For sample No. 15 the polymerization cycle was 24 hours at 90° C., and 64½ hours at 120° C. At the end of that time sample No. 15 was a stiff syrup. It was not heated at 180° C. because it was not desired to risk breaking the tube by the development of excessive pressure which might have occurred by virtue of the comparatively high vapor pressure of the unreacted monomer still present in the liquid. The compositions of the various samples were chosen in the manner set forth in the preceding example, so as to cover the compositions represented by the line joining the two binary polymerization azeotropes and a variety of compositions on each side of that line and at a varying distance from the line. No catalyst was added in any of these samples. The data are presented in Table II.

TABLE II.—VINYLXYLENE/METHYL METHACRYLATE/DIETHYL FUMARATE TERPOLYMERS

| Sample Number | Composition, Wt. Percent MMA/DEF/VX | Appearance | |
|---|---|---|---|
| | | Clarity | Color |
| 1 | 0/50/50 | C—Clear | Colorless. |
| 2 | 7/41/52 | ....do.... | Do. |
| 3 | 20/25/55 | C—Crystal Clear | Do. |
| 4 | 33/9/58 | C—Clear | Do. |
| 5 | 40/0/60 | C—Crystal Clear | Do. |
| 6 | 6/39/55 | C—Clear | Do. |
| 7 | 18/25/57 | ....do.... | Do. |
| 8 | 8/43/49 | ....do.... | Do. |
| 9 | 22/35/53 | ....do.... | Do. |
| 10 | 26/25/49 | C—Crystal Clear | Do. |
| 11 | 33/15/52 | ....do.... | Do. |
| 12 | 4/34/62 | O—Opaque | White. |
| 13 | 14/25/61 | C—Clear (poor surface on specimens gives appearance of haze). | Colorless. |
| 14 | 10/10/80 | O—Opaque | White. |
| 15 | 20/60/20 | CS—Clear (very stiff syrup).* | Colorless. |
| 16 | 55/20/25 | T—Turbid | Bluish White. |

*(No test for compatibility due to low conversion of monomer to polymer.)
MMA=Methylmethacrylate.
DEF=Diethyl fumarate.
VX=Vinylxylene.

Examination of the data of Table II as plotted on Figure II of the drawings shows that this system follows the rule as described herein, in that polymers prepared from monomeric mixtures whose compositions lie on and in an area lying along the line joining the two binary polymerization azeotropes are clear. Points 12 and 14 above the line in the direction of increasing vinylxylene content are opaque, and point 16 on the opposite side of the line is turbid. These points all lie a considerable distance from the line joining the two binary azeotrope compositions. As described in the other example, dashed lines have been drawn at the distance of 5 percent on each side of the line joining the two binary azeotropes, indicating a preferred group of monomer compositions.

The appearance of haze noted for sample 13 was established to be due to a poor surface on the cylinder of polymer and not due to haze within the polymer itself. The low conversion obtained in the two tubes constituting duplicates designated sample 15 made it impractical to subject this material to the usual high temperature. The conversion of monomer to polymer was so low that no conclusion could be drawn as to what the appearance of a high conversion polymer prepared from this monomeric mixture would be.

While the invention has been described herein with particular reference to various preferred embodiments thereof, it will be appreciated that variations from the details given herein can be effected without departing from the invention in its broadest aspects. When desired, the terpolymers of the present invention can be blended with other polymers, plasticizers, solvents, fillers, pigments, dyes, stabilizers, and the like, in accordance with the particular use intended.

We claim:

1. A clear terpolymer prepared by free-radical-initiated batch polymerization of a monomeric mixture consisting of (a) a monomer selected from the group consisting of styrene, vinyltoluene, and vinylxylene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and the particular alkyl methacrylate on the one hand and the particular (a) and the particular (c) on the other hand as plotted on an equilateral triangular coordinate graph.

2. A clear terpolymer prepared by free-radical-initiated batch mass polymerization of a monomeric mixture consisting of (a) a monomer selected from the group consisting of styrene, vinyltoluene, and vinylxylene (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and the particular alkyl methacrylate on the one hand and the particular (a) and the particular (c) on the other hand as plotted on an equilateral triangular coordinate graph.

3. A clear terpolymer prepared by free-radical-initiated batch polymerization of a monomeric mixture consisting of (a) styrene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of styrene and the particular alkyl methacrylate on the one hand and styrene and the particular (c) on the other hand as plotted on an equilateral triangular coordinate graph.

4. A clear terpolymer prepared by free-radical-initiated batch polymerization of a monomeric mixture consisting of (a) a monomer selected from the group consisting of styrene, vinyltoluene, and vinylxylene, (b) methyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and methyl methacrylate on the one hand and the particular (a) and the particular (c) on the other hand as plotted on an equilateral triangular coordinate graph.

5. A clear terpolymer prepared by free-radical-initiated batch mass polymerization of a monomeric mixture consisting of (a) styrene, (b) methyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of styrene and methyl methacrylate on the one hand and styrene and and the particular (c) on the other hand as plotted on an equilateral triangular coordinate graph.

6. A clear terpolymer prepared by free-radical-initiated batch mass polymerization of a monomeric mixture consisting of (a) vinyltoluene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of vinyltoluene and the particular alkyl methacrylate on the one hand and vinyltoluene and the particular (c) on the other hand as plotted on an equilateral triangular coordinate graph.

7. A clear terpolymer prepared by free-radical-initiated batch polymerization to a conversion of at least 20 weight percent of a monomeric mixture consisting of (a) a monomer selected from the group consisting of styrene, vinyltoluene, and vinylxylene, (b) a lower alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and the particular alkyl methacrylate on the one hand and the particular (a) and the particular (c) on the other hand as plotted on an equilateral triangular coordinate graph.

8. A terpolymer according ot claim 1 wherein (a) is vinylxylene.

9. A terpolymer according to claim 1 wherein (c) is acrylic acid.

10. A terpolymer according to claim 1 wherein (c) is a di-(lower alkyl) fumarate.

11. A terpolymer according to claim 1 wherein (c) is diethyl fumarate.

12. A clear terpolymer prepared by free-radical-initiated batch polymerization of a monomeric mixture consisting of (a) vinylxylene (b) methyl methacrylate, and (c) diethyl fumarate, the proportions of the three monomers in said monomeric mixture being limited to those in the area of mixtures that produce clear terpolymers, said area encompassing the line joining the polymerization azeotrope composition of vinylxylene and methyl methacrylate on the one hand and vinylxylene and diethyl fumarate on the other hand as plotted on an equilateral triangular coordinate graph.

13. A clear terpolymer prepared by free-radical-initiated batch polymerization of a monomeric mixture consisting of (a) styrene, (b) methyl methacrylate, and (c) acrylic acid, the proportions of the three monomers in said monomeric mixture being limited to those in the area of mixtures that produce clear terpolymers, said area encompassing the line joining the polymerization azeotrope composition of styrene and methyl methacrylate on the one hand and styrene and acrylic acid on the other hand as plotted on an equilateral triangular coordinate graph.

14. A clear terpolymer prepared by free-radical-initiated batch polymerization of a monomeric mixture consisting of (a) vinyltoluene, (b) methyl methacrylate, and (c) acrylic acid, the proportions of the three monomers in said monomeric mixture being limited to those in the area of mixtures that produce clear terpolymers, said area encompassing the line joining the polymerization azeotrope composition of vinyltoluene and methyl methacrylate on the one hand and vinyltoluene and acrylic acid on the other hand as plotted on an equilateral triangular coordinate graph.

15. A polymerization process which comprises forming a three-component monomeric mixture consisting of (a) a monomer selected from the group consisting of styrene, vinyltoluene, and vinylxylene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and the particular alkyl methacrylate on the one hand and the particular (a) and the particular (c) on the other hand as plotted on an equilateral triangular coordinate graph, and subjecting a batch of said monomeric mixture to free-radical-initiated batch polymerization forming an essentially clear homogeneous high molecular weight terpolymer.

16. A polymerization process which comprises forming a three-component monomeric mixture consisting of (a) styrene, (b) a lower alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of styrene and the particular alkyl methacrylate on the one hand and styrene and the particular (c) on the other hand as plotted on an equilateral triangular coordinate graph, and subjecting a batch of said monomeric mixture to free-radical-initiated batch mass high conversion polymerization forming an essentially clear homogeneous high molecular weight terpolymer.

17. A process according to claim 15 wherein (b) is methyl methacrylate.

18. A process according to claim 15 wherein (a) is styrene and (b) is methyl methacrylate.

19. A process according to claim 15 wherein (c) is acrylic acid.

20. A clear terpolymer prepared by free-radical-initiated batch polymerization of a monomeric mixture consisting of (a) a monomer selected from the group consisting of styrene, vinyltoluene, and vinylxylene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being limited to those in the area of mixtures that produce clear terpolymers, said area encompassing the line joining the polymerization azeotrope composition of the particular (a) and the particular alkyl methacrylate on the one hand and the particular (a) and the particular (c) on the other hand as plotted on an equilateral triangular coordinate graph, with the further limitation that said proportions of the three monomers are restricted to the area of said graph bounded by two lines on opposite sides of and parallel to and 5 graphical units distant from said line.

21. A clear terpolymer prepared by free-radical-initiated batch polymerization of a monomeric mixture consisting of (a) a monomer selected from the group consisting of styrene, vinyltoluene, and vinylxylene, (b) an alkyl methacrylate, and (c) a monomer selected from the group consisting of acrylic acid, methacrylic acid, dialkyl fumarate, monoalkyl fumarate, monoalkyl maleate, the proportions of the three monomers in said monomeric mixture being designated by the line joining the polymerization azeotrope composition of the particular (a) and the particular alkyl methacrylate on the one hand and the particular (a) and the particular (c) on the other hand as plotted on an equilateral triangular coordinate graph.

22. A terpolymer according to claim 20 wherein (b) is methyl methacrylate.

23. A terpolymer according to claim 20 wherein (c) is acrylic acid.

24. A terpolymer according to claim 20 wherein (c) is a dialkyl fumarate.

References Cited in the file of this patent

UNITED STATES PATENTS

| | | |
|---|---|---|
| 1,933,052 | Fikentscher et al. | Oct. 31, 1933 |
| 1,981,102 | Hagedorn et al. | Nov. 20, 1934 |
| 2,160,054 | Bauer et al. | May 30, 1939 |
| 2,604,457 | Segall et al. | July 22, 1952 |